(12) United States Patent
Schmidt et al.

(10) Patent No.: US 7,344,590 B2
(45) Date of Patent: Mar. 18, 2008

(54) SILVER PIGMENTS

(75) Inventors: Christoph Schmidt, Kriftel (DE);
Tanja Delp, Darmstadt (DE); Johann Dietz, Dietzenbach (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 10/811,143

(22) Filed: Mar. 29, 2004

(65) Prior Publication Data

US 2004/0221770 A1 Nov. 11, 2004

(30) Foreign Application Priority Data

Mar. 27, 2003 (DE) ................................ 103 13 978

(51) Int. Cl.
*C09C 3/06* (2006.01)
*C09C 1/28* (2006.01)
*C09C 1/36* (2006.01)
*C09C 1/40* (2006.01)
*C09D 7/12* (2006.01)
*C09D 11/00* (2006.01)
*C09D 17/00* (2006.01)

(52) U.S. Cl. ................ 106/415; 106/31.64; 106/31.65; 106/31.9; 106/436; 106/442; 106/446; 106/447; 47/57.6; 424/401; 426/540; 428/402; 428/403; 428/404; 524/413

(58) Field of Classification Search ................ 106/415, 106/428, 430, 431, 436, 442, 446, 447, 31.64, 106/31.65, 31.9; 428/402–404; 47/57.6; 424/401; 426/540; 524/413
See application file for complete search history.

(56) References Cited

U.S. PATENT DOCUMENTS 6,270,563 B1 * 8/2001 Herget et al. ................ 106/415
6,630,018 B2 * 10/2003 Bauer et al. ................. 106/415
6,840,993 B2 * 1/2005 Schmidt et al. ............. 106/417

FOREIGN PATENT DOCUMENTS

WO   WO 93/08237   *   4/1993

* cited by examiner

*Primary Examiner*—Anthony J. Green
(74) *Attorney, Agent, or Firm*—Millen, White, Zelano & Branigan, P.C.

(57) ABSTRACT

The present invention relates to silver pigments based on transparent, low-refractive-index, platelet-shaped substrates which have a high-refractive-index coating consisting of $TiO_2$ having a layer thickness of 5-300 nm and optionally an outer protective layer, and to the use thereof in paints, coatings, printing inks, security printing inks, plastics, button pastes, ceramic materials, glasses, for seed coloring, as dopants in the laser marking of plastics and papers, as additives for coloring in the foods and pharmaceuticals sectors, and in cosmetic formulations and for the preparation of pigment compositions and dry preparations.

10 Claims, No Drawings

SILVER PIGMENTS

The present invention relates to silver interference pigments based on platelet-shaped, transparent, low-refractive-index substrates and to the use thereof in paints, coatings, printing inks, plastics, as dopants for the laser marking of plastics and papers, as additives in the foods and pharmaceuticals sectors and in cosmetic formulations.

Luster or effect pigments are employed in many areas of industry, in particular in the area of automotive finishes, decorative coatings, plastics, paints, printing inks and in cosmetic formulations.

Owing to their color play, Luster pigments, which exhibit an angle-dependent color change between a plurality of interference colors, are of particular interest for automotive finishes and in forgery-proof documents of value.

Mineral-based pearlescent pigments are of particular importance. Pearlescent pigments are prepared by coating an inorganic, platelet-shaped support with a high-refractive-index, usually oxidic layer. The color of these pigments is caused by wavelength-selective partial reflection and interference of the reflected or transmitted light at the medium/oxide or oxide/substrate interfaces.

The interference color of these pigments is determined by the thickness of the oxide layer. The hue of a silver pigment is generated by a (in the optical sense) single high-refractive-index layer whose optical thickness causes a reflection maximum (1st order) in the visible wavelength range at about 500 nm. This wavelength is perceived by the human eye as the color green. However, the intensity curve of this maximum on its wavelength axis is so broad that so much light is reflected throughout the region of visible light that the human eye perceives a very bright, but colorless impression.

According to the known rules—in particular from the coating of optical components—of the optics of thin layers, the intensity of the reflected light in an arrangement of a plurality of layers with alternating high and low refractive indexes increases greatly compared with a single layer. Thus, the application of a $TiO_2$—$SiO_2$—$TiO_2$ layer system to mica particles increases the intensity of the reflected light by about 60% compared with a $TiO_2$ single-layer system. Accordingly, the profile of the light reflected by interference is significantly more pronounced, so that an intense and bright reflection color must be expected for a multilayered system of this type. Pigments of this type are described in DE 196 18 569 A1.

The prior art discloses silver pigments based on mica platelets which have a very broad scattering of the layer thickness and therefore have a neutral behavior with respect to the interference color. Pearlescent pigments that have a single high-refractive-index coating of mica therefore represent single-layer optical systems, i.e. the interference color is determined exclusively by the layer thickness of the high-refractive-index metal-oxide layer. The coloristic design latitude of a mica/metal oxide silver pigment is therefore very restricted.

In addition, mica particles, owing to their layer structure, have irregularities on the surface which cause scattering and thus reduce the transparency and coloristic quality of the product. Furthermore, mica exhibits a more or less highly pronounced grey-brown body color. This property reduces the transparency further and influences the absorption color of the application media in an undesired manner.

Furthermore, multilayered pigments which cause a silver color impression, as described, for example, in EP 1213330 A1, are known. In the case of these pigments, an intense color can be suppressed by the $SiO_2$ layer of the $TiO_2$—$SiO_2$—$TiO_2$ layer sequence having been applied very thinly (about 50 nm). These pigments, like the single-layered mica-based silver pigments, offer only a very small latitude in the design of the coloristic properties and have the above-mentioned disadvantages of mica as substrate.

The object of the present invention is therefore to provide a silver-colored interference pigment which is distinguished, in particular, by high transparency, a pure-white body color and coloristic design possibilities which go beyond an exclusively silver effect.

Surprisingly, it has now been found that a specific transparent, low-refractive-index platelet, such as, for example, an $SiO_2$ platelet, coated with a thin $TiO_2$ layer causes a silver color impression. This is achieved through the coating of the platelet with a $TiO_2$ layer whose thickness is "matched" precisely to the thickness of the platelet.

The interference color of a thin layer is determined by its thickness. In a lamellar thin layer system like coated thin platelets the color is a result of the reflection of the whole stack of layers as one reflection system.

On substrates with somewhat different mean thickness similar color effects can be achieved by "matching" of the thickness of the titanium dioxide coating. This is done by color measurements during the coating process and interruption of the coating process when the desired color on the respective substrate is obtained.

To maintain the described silver color effect on substrates with different mean thickness it is necessary to choose an individual coating thickness for every particular substrate thickness. This is also done by the above described matching of coating thickness.

Compared with single-coated mica-based silver pigments and the interference pigments from EP 1213330 A1, the pigments according to the invention exhibit the following properties:

excellent transparency in the application medium
pure-white body color
very bright silver interference color.

In addition to these properties, the pigments according to the invention are distinguished over the known interference pigments by the following features:

strong sparkle effect
adjustable hue
angle-dependence of the hue

The said hue can be varied over a broad range by adjusting (i.e., "matching") the $TiO_2$ layer thickness and through the choice of transparent platelets, such as, for example, $SiO_2$ platelets, of various thickness without losing the impression of an interference pigment. Such matching as described above, is conventional.

The invention therefore relates to silver interference pigments based on platelet-shaped, transparent, low-refractive-index substrates which have a high-refractive-index coating consisting of $TiO_2$ having a layer thickness of 5-300 nm and optionally an outer protective layer.

The invention furthermore relates to the use of the silver pigments according to the invention in paints, coatings, printing inks, plastics, button pastes, ceramic materials, glasses, for seed coating, as dopants in the laser marking of plastics and papers, as additives for coloring in the foods and pharmaceuticals sectors and in particular in cosmetic formulations. The pigments according to the invention are furthermore also suitable for the preparation of pigment compositions and for the preparation of dry preparations, such as, for example, granules, chips, pellets, briquettes, etc. The dry preparations are particularly suitable for printing inks and for cosmetic formulations.

Suitable substrates are all low refractive index inorganic and organic transparent materials which can be produced in the form of finely divided platelets having a narrow thickness distribution. Suitable organic substrates are, inter alia, polymers, such as, for example, polyesters (for example PET), polycarbonates, polyimides and polymethacrylates.

Suitable base substrates for the interference pigments according to the invention are substrates having a refractive index of <1.9, for example platelet-shaped $SiO_2$ platelets, as described, for example, in WO 93/08237. Furthermore, besides the said $SiO_2$ platelets, any platelet-shaped, transparent substrate known to the person skilled in the art, such as, for example, $Al_2O_3$ platelets, glass platelets and platelet-shaped plastic particles, is suitable. Very particularly preferred substrates are $SiO_2$ platelets. The particular properties, such as the tuneable hue and in particular the angle dependence thereof, are particularly supported by a defined average density with a narrow thickness distribution.

Particular preference is given to the production of interference pigments based on substrates of $SiO_2$, $Al_2O_3$, all single crystals with a flaky appearance and glass platelets, all coated with a thin titanium dioxide layer.

The standard deviation of the thickness of the substrate platelets is therefore $\leq 20\%$, more preferably $\leq 10\%$ and particularly preferably $\leq 5\%$, based on the average layer thickness thereof.

"Low" refractive index is understood in the art to refer to materials with refractive index $\leq 1.9$, while "high" refractive index refers to >1.9.

The size of the base substrate is not crucial per se and can be matched to the particular application. In general, the platelet-shaped transparent substrates have an average thickness of between 0.02 and 10 µm, preferably between 0.03 and 5 µm, in particular between 0.05 and 3 µm. The size in the two other dimensions is usually between 1 and 450 µm, preferably between 2 and 200 µm and in particular between 5 and 100 µm.

The aspect ratio (diameter/thickness ratio) of the substrate is preferably 1-1000, in particular 3-500 and very particularly preferably 5-200.

The thickness of the $TiO_2$ layer and of the substrate, for example $SiO_2$ substrate, is important for the optical properties of the pigment. The thickness of the layer is preferably set precisely and matched to the average thickness of the substrate platelets. Preference is given to $TiO_2$ layer thicknesses of 5-300 nm, preferably 10-200 nm, in particular 30-150 nm.

The pigments according to the invention can be prepared relatively easily by forming a high-refractive-index $TiO_2$ interference layer having precisely defined thickness and a smooth surface on the finely divided, platelet-shaped substrates. The $TiO_2$ can be either in the form of rutile or in the form of anatase. The $TiO_2$ is preferably in the rutile modification. Particular preference is given to $SiO_2$ platelets coated with a rutile layer.

The metal-oxide layer is preferably applied by wet-chemical methods, it being possible to use the wet-chemical coating methods developed for the preparation of pearlescent pigments. Methods of this type are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017, and also in further patent documents and other publications known to the person skilled in the art.

In the case of wet coating, the substrate particles are suspended in water, and one or more hydrolysable titanium salts are added at a pH which is suitable for hydrolysis, the latter being selected in such a way that the metal oxides or metal oxide hydrates are precipitated directly onto the platelets without significant secondary precipitations occurring. The pH is usually kept constant by simultaneous metering-in of a base and/or acid. The pigments are subsequently separated off, washed and dried at 50-150° C. and, if desired, calcined for 0.5-3 hours, where the calcination temperature can be optimised with respect to the coating present in each case. In general, the calcination temperatures are between 250 and 1000° C., preferably between 350 and 950° C.

The coating can furthermore also be carried out in a fluidised-bed reactor by gas-phase coating, it being possible, for example, correspondingly to use the processes proposed in EP 0 045 851 A1 and EP 0 106 235 A1 for the preparation of pearlescent pigments. Thus, the pigments of the invention can also be prepared by hydrolytic decomposition of metal salts in aqueous medium or by thermal decomposition by a CVD or PVD process.

The hue of the pigments can be varied within very broad limits while retaining the silver effect by choosing different covering amounts or layer thicknesses resulting therefrom. The fine tuning for a certain hue can be achieved beyond the pure choice of amount by approaching the desired color under visual or measurement technology control.

In order to increase the light, water and weather stability, it is frequently advisable, depending on the area of application, to subject the finished pigment to post-coating or post-treatment. Suitable post-coatings or post-treatments are the processes described, for example, in German Patent 22 15 191, DE-A 31 51 354, DE-A 32 35 017 and DE-A 33 34 598. This post-coating further increases the chemical stability or simplifies handling of the pigment, in particular incorporation into various media. In order to improve the wettability, dispersibility and/or compatibility with the application media, functional coatings of $Al_2O_3$ or $ZrO_2$ or mixtures or mixed phases thereof may be applied to the pigment surface furthermore, organic or combined organic/inorganic post-coatings are possible, for example with silanes, as described, for example, in EP 0090259, EP 0 634 459, WO 99/57204, WO 96/32446, WO 99/57204, U.S. Pat. No. 5,759,255, U.S. Pat. No. 5,571,851, WO 01/92425 or in J. J. Ponjeé, Philips Technical Review, Vol. 44, No. 3, 81 ff., and P. H. Harding J. C. Berg, J. Adhesion Sci. Technol. Vol.11 No. 4, pp. 471-493.

The silver pigments according to the invention are simple and easy to handle. The pigments can be incorporated into the application system by simple stirring-in. Complex grinding and dispersal of the pigments is not necessary.

Since the silver pigments according to the invention combine high gloss with high transparency and a pure-white body color, they enable particularly effective effects to be achieved in the various application media without the absorption color being significantly affected.

It goes without saying that, for the various applications, the interference pigments can also advantageously be used in the form of a mixture with organic dyes, organic pigments or other pigments, such as, for example, transparent and opaque white, colored and black pigments, and with platelet-shaped iron oxides, organic pigments, holographic pigments, LCPs (liquid crystal polymers) and conventional transparent, colored and black Luster pigments based on metal oxide-coated mica and $SiO_2$ platelets, etc. The interference pigments can be mixed in any ratio with commercially available pigments and fillers.

In the various applications, the pigment according to the invention can also be combined with further colorants of any type, for example organic and/or inorganic absorption pigments and dyes, multilayered interference pigments, such as, for example, Timiron®, Sicopearl® (BASF AG), Chroma-Flair® (Flex Products Inc.), BiOCl pigments, pearl essence or metal pigments, for example from Eckart. There are no limits to the mixing ratios and concentration.

The pigments according to the invention are compatible with a multiplicity of color systems, preferably from the area of paints, coatings and printing inks. For the production of printing inks for, for example, gravure printing, flexographic printing, offset printing or offset overprinting, a multiplicity of binders, in particular water-soluble grades, as marketed, for example, by BASF, Marabu, Pröll, Sericol, Hartmann, Gebr. Schmidt, Sicpa, Aarberg, Siegberg, GSB-Wahl, Follmann, Ruco or Coates Screen INKS GmbH, are suitable. The printing inks may be water-based or solvent-based. The pigments are furthermore also suitable for the laser marking of paper and plastics and for applications in the agricultural sector, for example for greenhouse sheeting, and, for example, for the coloring of tent awnings.

The silver pigment according to the invention can be used for the pigmenting of surface coatings, printing inks, plastics, agricultural sheeting, seed coatings, food colorings, button pastes, medicament coatings or cosmetic formulations, such as lipsticks, nail varnishes, compact powders, shampoos, loose powders and gels. The concentration of the pigment mixture in the application system to be pigmented is generally between 0.1 and 70% by weight, preferably between 0.1 and 50% by weight and in particular between 0.5 and 10% by weight, based on the total solids content of the system. It is generally dependent on the specific application.

Plastics comprising the silver pigment according to the invention in amounts of from 0.01 to 50% by weight, in particular from 0.1 to 7% by weight, are frequently distinguished by a particularly pronounced sparkle effect.

In the surface coatings sector, in particular in automotive paints, the silver pigment is also employed for three-coat systems in amounts of 0.1-10% by weight, preferably from 1 to 3% by weight.

In surface coatings, the pigment according to the invention has the advantage that the target gloss is achieved by a one-coat finish (one-coat system or base coat in two-coat systems). Compared with finishes comprising a mica-based multilayered pigment instead of the silver pigment according to the invention, finishes comprising the pigment according to the invention exhibit a clearer depth effect and a more highly pronounced gloss effect.

The silver pigment according to the invention can also advantageously be employed in decorative and care cosmetics. The use concentration extends from 0.01% by weight in shampoos to 100% by weight in the case of loose powders. In the case of a mixture of the silver pigments with spherical fillers, for example $SiO_2$, the concentration can be 0.01-70% by weight in the formulation. The cosmetic products, such as, for example, nail varnishes, lipsticks, compact powders, shampoos, loose powders and gels, are distinguished by particularly interesting gloss effects. The sparkle effect in nail varnish can be significantly increased compared with conventional nail varnishes with the aid of the pigments according to the invention. Furthermore, the pigment according to the invention can be employed in bath additives, toothpastes and for the finishing of foods, for example mass coloring and/or coatings of boiled sweets, wine gums, such as, for example, jelly babies, pralines, liquorice, confectionery, sticks of rock, fizzy drinks, sodas, etc., or as a coating, for example, in standard and coated tablets in the pharmaceuticals sector.

The pigment according to the invention can furthermore be mixed with commercially available fillers. Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be, for example, platelet-shaped, spherical or needle-shaped in accordance with requirements.

It is of course also possible for the pigments according to the invention to be combined in the formulations with cosmetic raw materials and assistants of any type. These include, inter alia, oils, fats, waxes, film formers, preservatives and assistants which generally determine the technical properties, such as, for example, thickeners and Theological additives, such as, for example, bentonites, hectorites, silicon dioxides, Ca silicates, gelatins, high-molecular-weight carbohydrates and/or surface-active assistants, etc.

The formulations comprising the pigments according to the invention can belong to the lipophilic, hydrophilic or hydrophobic type. In the case of heterogeneous formulations having discrete aqueous and non-aqueous phases, the pigments according to the invention may in each case be present in only one of the two phases or alternatively distributed over both phases.

The pH values of the formulations can be between 1 and 14, preferably between 2 and 11 and particularly preferably between 5 and 8.

No limits are set for the concentrations of the pigments according to the invention in the formulation. They can be—depending on the application—between 0.001 (rinse-off products, for example shower gels) and 100% (for example gloss-effect articles for particular applications).

The pigments according to the invention may furthermore also be combined with cosmetic active ingredients. Suitable active ingredients are, for example, insect repellents, UV A/BC protective filters (for example OMC, B3 and MBC), anti-ageing active ingredients, vitamins and derivatives thereof (for example vitamin A, C, E, etc.), self-tanning agents (for example DHA, erythrulose, inter alia), and further cosmetic active ingredients, such as, for example, bisabolol, LPO, ectoin, emblica, allantoin, bioflavonoids and derivatives thereof.

In the pigmenting of binder systems, for example for surface coatings and printing inks for gravure printing, offset printing or screen printing, or as precursors for printing inks, the use of the interference pigments according to the invention in the form of highly pigmented pastes, granules, pellets, etc., has proven particularly suitable. The pigment is generally incorporated into the printing ink in amounts of 2-35% by weight, preferably 5-25% by weight and in particular 8-20% by weight. Offset printing inks can comprise the pigments in amounts of up to 40% by weight or more. The precursors for printing inks, for example in the form of granules, as pellets, briquettes, etc., comprise up to 98% by weight of the pigment according to the invention in addition to the binder and additives. Printing inks comprising the pigment according to the invention exhibit purer silver hues than with conventional effect pigments. The particle thicknesses of the pigments according to the invention are relatively small and therefore effect particularly good printability.

The interference pigments according to the invention are furthermore suitable for the preparation of flowable pigment compositions and dry preparations, in particular for printing inks, comprising one or more silver pigments according to the invention, binders and optionally one or more additives.

The invention thus also relates to formulations comprising the silver pigment according to the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

Example 1

Silver Pigment with Color Travel from Green Via Red-Violet to Gold-Green 100 g of $SiO_2$ platelets (particle size 5-50 µm, average thickness 450 nm, standard deviation of the thickness: 5%) are suspended in 2 l of deinonized water and heated to 80° C. with vigorous stirring. A solution of 12 g of $SnCl_4 \times 5\ H_2O$ and 40 ml of hydrochloric acid (37%) in 360 ml of deionized water is metered into this mixture at pH 1.6 at a rate of 4 ml/min. 370 ml of $TiCl_4$ solution (400 g of $TiCl_4$/l) are subsequently metered in at a pH of 1.6 at a rate of 2 ml/min. The pH is kept constant during the addition of both the $SnCl_4 \times 5\ H_2O$ solution and $TiCl_4$ solutions using NaOH solution (32%). The pH is subsequently adjusted to 5.0 using sodium hydroxide solution (32%), and the mixture is stirred for a further 15 minutes.

For work-up, the pigment is filtered off, washed with 20 l of deinonized water, dried at 110° C. and calcined at 850° C. for 30 minutes. The product is a silver interference pigment having a slight green tint which shifts via red-violet to gold-green when viewed at an angle.

Example 2

Silver Pigment with Color Travel from Neutral Silver Via Red-Violet to Gold-Yellow 100 g of $SiO_2$ platelets (particle size 5-50 µm, average thickness 450 nm, standard deviation of the thickness: 5%) are suspended in 2 l of deionized water and heated to 80° C. with vigorous stirring. A solution of 12 g of $SnCl_4 \times 5\ H_2O$ and 40 ml of hydrochloric acid (37%) in 360 ml of deionized water is metered into this mixture at pH 1.6 at a rate of 4 ml/min. 350 ml of $TiCl_4$ solution (400 g of $TiCl_4$/l) are subsequently metered in at a pH of 1.6 at a rate of 2 ml/min. The pH is kept constant during the addition of both the $SnCl_4 \times 5\ H_2O$ solution and $TiCl_4$ solutions using NaOH solution (32%). The pH is subsequently adjusted to 5.0 using sodium hydroxide solution (32%), and the mixture is stirred for a further 15 minutes. For work-up, the pigment is filtered off, washed with 20 l of deionized water, dried at 110° C. and calcined at 850° C. for 30 minutes. The product is a silver interference pigment whose color shifts via red-violet to gold-yellow when viewed at an angle.

Example 3

Silver Pigment with Color Travel from Slightly Bluish Silver Via Red to Gold-Green 100 g of $SiO_2$ platelets (particle size 5-50 µm, average thickness 450 nm, standard deviation of the thickness: 5%) are suspended in 2 l of deionized water and heated to 80° C. with vigorous stirring. A solution of 12 g of $SnCl_4 \times 5\ H_2O$ and 40 ml of hydrochloric acid (37%) in 360 ml of deionized water is metered into this mixture at pH 1.6 at a rate of 4 ml/min. 340 ml of $TiCl_4$ solution (400 g of $TiCl_4$/l) are subsequently metered in at a pH of 1.6 at a rate of 2 ml/min. The pH is kept constant during the addition of both the $SnCl_4 \times 5\ H_2O$ solution and $TiCl_4$ solutions using NaOH solution (32%). The pH is subsequently adjusted to 5.0 using sodium hydroxide solution (32%), and the mixture is stirred for a further 15 minutes.

For work-up, the pigment is filtered off, washed with 20 l of deionized water, dried at 110° C. and calcined at 850° C. for 30 minutes. The product is a silver interference pigment whose color shifts via red to gold-green when viewed at an angle.

Use Example

Example A

Shimmering Foundation

| Raw material | Source of supply | INCI | [%] |
|---|---|---|---|
| Phase A | | | |
| Extender W | Merck KGaA/Rona ® | MICA, CI 77891 (Titanium Dioxide) | 9.00 |
| MICRONA ® Matte Yellow | Merck KGaA/Rona ® | MICA, CI 77492 (Iron Oxides) | 4.00 |
| MICRONA ® Matte Red | Merck KGaA/Rona ® | MICA, CI 77491 (Iron Oxides) | 0.40 |
| MICRONA ® Matte Black | Merck KGaA/Rona ® | MICA, CI 77499 (Iron Oxides) | 0.30 |
| Pigment from Example 1 | Merck KGaA | | 4.50 |
| RONASPHERE ® | Merck KGaA/Rona ® | SILICA | 5.00 |
| Phase B | | | |
| Blanose 7 HF | Aqualon GmbH | Cellulose Gum | 0.20 |
| Veegum | Vanderbilt | Magnesium Aluminium Silicate | 1.00 |
| Texapon K 1296 | Cognis GmbH | Sodium Lauryl Sulfate | 0.60 |
| Triethanolamine extra pure | Merck KGaA/Rona ® | Triethanolamine | 0.50 |
| Titriplex III | Merck KGaA/Rona ® | Disodium EDTA | 0.25 |
| Methyl 4-hydroxy-benzoate | Merck KGaA/Rona ® | Methylparaben | 0.15 |
| 1,2-Propanediol | Merck KGaA/Rona ® | Propylene Glycol | 10.90 |
| Water, demineralised | | Aqua (Water) | 42.95 |
| Phase C | | | |
| Isopropyl myristate | Cognis GmbH | Isopropyl Myristate | 8.00 |
| Liquid paraffin | Merck KGaA/Rona ® | Paraffinum Liquidum (Mineral Oil) | 3.60 |
| Crodamol SS | Croda GmbH | Cetyl Esters | 2.60 |
| Monomuls 60-35 C | Cognis GmbH | Hydrogenated Palm Glycerides | 1.70 |
| Stearic acid | Merck KGaA/Rona ® | Stearic Acid | 1.50 |

-continued

| Raw material | Source of supply | INCI | [%] |
|---|---|---|---|
| EUSOLEX ® 6300 | Merck KGaA/Rona ® | 4-Methylbenzylidene Camphor | 1.30 |
| EUSOLEX ® 4360 | Merck KGaA/Rona ® | Benzophenone-3 | 0.50 |
| Rona Care ™ Tocopherol acetate | Merck KGaA/Rona ® | Tocopheryl Acetate | 0.50 |
| Magnesyl stearate | Merck KGaA/Rona ® | Magnesium Stearate | 0.10 |
| Propyl 4-hydroxy-benzoate | Merck KGaA/Rona ® | Propylparaben | 0.05 |
| Phase D | | | |
| Perfume oil 200 529 | Fragrance Resources | Perfume | 0.20 |
| Euxyl K 400 | Schülke & Mayr GmbH | Phenoxyethanol, Methyldibromo, Glutaronitrile | 0.20 |

Preparation:

Melt and stir all constituents of phase C at about 75° C. until everything has melted. Initially introduce the water of phase B cold, homogenize in the Blanose using the Turrax, scatter in the Veegum, and re-homogenize. Warm to 75° C. and dissolve the other constituents therein with stirring. Stir in the constituents of phase A. Add phase C at 75° C. with stirring and homogenize for 2 minutes. Cool the mixture to 40° C. with stirring, add phase D. Cool further to room temperature with stirring and adjust to pH 6.0-6.5 (for example using citric acid solution).

Example B

Shower Gel

| Raw material | Source of supply | INCI | [%] |
|---|---|---|---|
| Phase A | | | |
| Pigment from Example 2 | Merck KGaA | | 0.10 |
| Keltrol T | Kelco | Xanthan Gum | 0.75 |
| Water, demineralised | | Aqua (Water) | 64.95 |
| Phase B | | | |
| Plantacare 2000 UP | Cognis GmbH | Decyl Glucoside | 20.00 |
| Texapon ASV 50 | Cognis GmbH | Sodium Laureth Sulfate, Sodium Laureth-8 Sulfate, Magnesium Laureth Sulfate, Magnesium Laureth-8 Sulfate, Sodium Oleth Sulfate, Magnesium Oleth Sulfate | 3.60 |
| Bronidox L | Cognis GmbH | Propylene Glycol, 5-Bromo-5-Nitro-1,3-Dioxane | 0.20 |
| Perfume oil Everest 79658 SB (deleted) | Haarmann & Reimer GmbH | Perfume | 0.05 |
| 1% FD&C lue No. 1 in water | BASF AG | Aqua (Water), CI 42090 (FD&C Blue No. 1) | 0.20 |
| Phase C | | | |
| Citric acid monohydrate | Merck KGaA/Rona ® | Citric Acid | 0.15 |
| Water, demineralised | | Aqua Water | 10.00 |

Preparation:

For phase A, stir the pigment into the water. Slowly scatter in the Keltril T with stirring and stir until it has dissolved. Add phases B and C successively while stirring slowly until everything is homogeneously distributed. Adjust the pH to from 6.0 to 6.4.

Example C

Eyeliner Gel

| Raw material | Source of supply | INCI | [%] |
|---|---|---|---|
| Phase A | | | |
| Pigment from Example 3 | Merck KGaA | | 5.00 |
| Xirona ® Magic Mauve | Merck KGaA/Rona ® | Silica, CI 77891 (Titanium Dioxide), Tin oxide | 10.00 |
| Mica Black | Merck KGaA/Rona ® | CI 77499 (Iron Oxides), MICA, CI 77891 (Titanium Dioxide) | 5.00 |
| RONASPHERE ® | Merck KGaA/Rona ® | Silica | 2.00 |
| Carbopol ETD 2001 | BF Goodrich | Carbomer | 0.40 |
| Citric acid monohydrate | Merck KGaA/Rona ® | Citric Acid | 0.00 |
| Water, demineralised | | Aqua (Water) | 60.00 |
| Phase B | | | |
| Glycerol, anhydrous | Merck KGaA/Rona ® | Glycerin | 4.00 |
| Triethanolamine extra pure | Merck KGaA/Rona ® | Triethanolamine | 0.90 |
| Luviskol VA 64 Powder | BASF AG | PVP/VA Copolymer | 2.00 |
| Germaben II | ISP Global Technologies | Propylene Glycol, Diazolidinyl Urea, Methylparaben, Propylparaben | 1.00 |
| Water, demineralised | | Aqua (Water) | 9.70 |

Preparation:

Disperse the effect pigments and Ronasphere® in the water of phase A. Acidify using a few drops of citric acid in order to reduce the viscosity, scatter in the Carbopol with stirring. After complete dissolution, slowly stir in the pre-dissolved phase B and adjust the pH to from 7.0 to 7.5.

Example D

Eye Shadow

| Raw material | Source of supply | INCI | [%] |
|---|---|---|---|
| Phase A | | | |
| Xirona ® Caribbean Blue | Merck KGaA/Rona ® | Silica, CI 77891 (Titanium Dioxide), Mica, Tin Oxide | 45.00 |
| Mica Black | Merck KGaA/Rona ® | CI 77499 (Iron Oxides), MICA, CI 77891 (Titanium Dioxide) | 5.00 |
| Pigment from Example 1 | Merck KGaA | | 5.00 |
| BIRON ® B 50 | Merck KGaA/Rona ® | CI 77163 (Bismuth Oxy-chloride) | 3.00 |
| Colorona ® Dark Blue | Merck KGaA/Rona ® | MICA, CI 77891 (Titanium Dioxide), CI 77510 (Ferric Ferro-cyanide) | 10.00 |
| Magnesium stearate | Merck KGaA/Rona ® | Magnesium Stearate | 2.50 |
| White clay (deleted) | Merck KGaA/Rona ® | Kaolin | 5.00 |
| Hubersorb 600 | J.M. Huber Corp. | Calcium Stearate | 0.50 |
| Talc | Merck KGaA/Rona ® | Talc | 11.00 |
| Phase B | | | |
| Amerchol L 101 | Amerchol | Lanolin Alcohol, Paraffinum Liquidum (Mineral Oil) | 10.70 |
| Super Hartolan | Croda GmbH | Lanolin Alcohol | 1.00 |

-continued

| Raw material | Source of supply | INCI | [%] |
|---|---|---|---|
| Ewalin 1751 | H. Erhard Wagner GmbH | Petrolatum | 1.00 |
| Propyl 4-hydroxy-benzoate | Merck KGaA/Rona ® | Propylparaben | 0.10 |
| Perfume oil Elegance # 79228 D MF | Haarmann & Reimer GmbH | Perfume | 0.20 |

Preparation:

Combine and pre-mix the constituents of phase A. Subsequently add the molten phase B dropwise to the powder mixture with stirring. The powders are pressed at from 40 to 50 bar.

Example E

Eye Shadow Gel

| Raw material | Source of supply | INCI | [%] |
|---|---|---|---|
| Phase A | | | |
| Xirona ® Indian Summer | Merck KGaA/Rona ® | Silica, Cl 77491 (Iron Oxides) | 15.00 |
| Pigment from Example 3 | Merck KGaA | | 5.00 |
| RONASPHERE ® | Merck KGaN/Rona ® | SILICA | 3.00 |
| Carbopol ETD 2001 | BF Goodrich GmbH | CARBOMER | 0.30 |
| Citric acid monohydrate | Merck KGaA/Rona ® | Citric Acid | 0.00 |
| Water, demineralized | | Aqua (Water) | 60.00 |
| Phase B | | | |
| Glycerol, anhydrous | Merck KGaA/Rona ® | Glycerin | 2.00 |
| Germaben II | ISP Global Technologies | Propylene Glycol, Diazolidinyl Urea, Methylparaben, Propylparaben | 0.20 |
| Triethanolamine extra pure | Merck KGaA/Rona ® | Triethanolamine | 0.70 |
| Water, demineralized | | Aqua (Water) | 13.80 |

Preparation:

Disperse the effect pigments and Ronasphere® in the water of phase A. Acidify using a few drops of citric acid in order to reduce the viscosity, scatter in the Carbopol with stirring. After complete dissolution, slowly stir in the pre-dissolved phase B.

Example F

Eye Shadow

| Raw material | Source of supply | INCI | [%] |
|---|---|---|---|
| Phase A | | | |
| Xirona ® Caribbean Blue | Merck KGaA/Rona ® | Silica, Cl 77891 (Titanium Dioxide), MICA, TIN Oxide | 20.00 |
| Colorona ® Dark Blue | Merck KGaA/Rona ® | MICA, Cl 77891 (Titanium Dioxide), Cl 77510 (Ferric Ferro-cyanide) | 5.00 |
| Pigment from Example 2 | Merck KGaA | | 5.00 |
| Talc | Merck KGaA/Rona ® | Talc | 49.50 |
| Potato starch | Sudstarke GmbH | Solanum Tuberosum (Potato Starch) | 7.50 |
| Magnesium stearate | Merck KGaA/Rona ® | Magnesium Stearate | 2.50 |

-continued

| Raw material | Source of supply | INCI | [%] |
|---|---|---|---|
| Phase B | | | |
| Isopropyl stearate | Cognis GmbH | Isopropyl Stearate | 9.14 |
| Cetyl palmitate | Merck KGaA/Rona ® | Cetyl Palmitate | 0.53 |
| Ewalin 1751 | H. Erhard Wagner GmbH | Petrolatum | 0.53 |
| Perfume oil Elegance # 79228 D MF | Haarmann & Reimer GmbH | Perfume | 0.20 |
| Propyl 4-hydroxy-benzoate | Merck KGaA/Rona ® | Propylparaben | 0.10 |

Preparation:

Combine and pre-mix the constituents of phase A. Subsequently add the molten phase B dropwise to the powder mixture with stirring. The powders are pressed at from 40 to 50 bar.

Example G

Nail Varnish

| Raw material | Source of supply | INCI | [%] |
|---|---|---|---|
| Pigment from Example 1 | Merck KGaA | | 2.00 |
| Thixotropic nail varnish base 1348 | International Lacquers S.A. | Toluene, Ethyl Acetate, Butyl Acetate, Nitro-cellulose, Tosyl-amide/Formaldehyde | 98.00 |

-continued

| Raw material | Source of supply | INCI | [%] |
|---|---|---|---|
| | | Resin, Dibutyl Phthalate, Isopropyl Alcohol, Stearalkonium Hectorite, Camphor, Acrylates Copolymer, Benzophenone-1 | |

Preparation:

The pigment is weighed out together with the varnish base, mixed well by hand using a spatula and subsequently stirred at 1000 rpm for 10 minutes.

Example H

Lip Lacquer

| Raw material | Source of supply | INCI | [%] |
|---|---|---|---|
| Phase A | | | |
| Pigment from Example 1 | Merck KGaA | | 2.50 |
| Timiron ® Splendid Violet | Merck KGaA/Rona ® | MICA, Silica, Cl 77891 (Titanium Dioxide) | 5.00 |
| Xirona ® Indian Summer | Merck KGaA/Rona ® | Silica, Cl 77491 (Iron Oxides) | 2.50 |
| Rubis Covapate W 4765 | Les Colorants Wackherr | Ricinus Communis (Castor Oil), Cl 15850 (D&C Red No. 7 Calcium Lake) | 5.00 |
| Phase B | | | |
| Foralyn 5020-F | Hercules BV | Methyl Hydrogenated Rosinate | 20.00 |
| Adeps Lanae | Henry Lamotte GmbH | Lanolin | 18.00 |
| Castor oil | Henry Lamotte GmbH | Ricinus Communis (Castor Oil) | 13.75 |
| Foral 85-E | Hercules BV | Glyceryl Hydrogenated Rosinate | 12.00 |
| Jojoba oil | Gustav Heess GmbH | Buxus Chinensis (Jojoba oil) | 5.00 |
| Eusolex ® 2292 | Merck KGaA/Rona ® | Ethylhexyl Methoxy-cinnamate, BHT | 3.00 |
| Antaron V-216 | ISP Global Technologies | PVP/Hexadecene Copolymer | 4.00 |
| Candelilla Wax 2039 L | Kahl & Co. | Candelilla Cera (Candelilla Wax) | 3.50 |
| Amerchol L 101 | Amerchol | Lanolin Alcohol, Paraffinum Liquidum (Mineral Oil) | 3.00 |

-continued

| Raw material | Source of supply | INCI | [%] |
|---|---|---|---|
| Rohagit S | Rohm GmbH | Acrylates Copolymer | 1.50 |
| Beeswax white | Merck KGaA/Rona ® | Cera Alba (Beeswax) | 1.00 |
| Propyl 4-hydroxy-benzoate | Merck KGaA/Rona ® | Propylparaben | 0.10 |
| Oxynex ® K liquid | Merck KGaA/Rona ® | PEG-8, Tocopherol, Ascorbyl Palmitate, Ascorbic Acid, Citric Acid | 0.05 |
| Phase C | | | |
| Fragrance Tendresse # 75418C | Haarmann & Reimer GmbH | Perfume | 0.10 |

Preparation:

Warm all constituents (apart from the Foral 85-E) of phase B to 80° C. and slowly add the Foral 85-E with stirring. Add phase A and phase C to the molten phase B. Pour the homogeneous melt into the mould at 50° C.

The entire disclosure[s] of all applications, patents and publications, cited herein and of corresponding German application No. 103 13 978.8, filed Mar. 27, 2003 and is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

Upon further study of the specification and appended claims, further objects and advantages of this invention will become apparent to those skilled in the art.

The invention claimed is:

1. A silver pigment, consisting of a transparent, platelet-shaped substrate, which is an $SiO_2$ platelet, $Al_2O_3$ platelet, a polymer platelet, a single crystal or a glass platelet, having a refractive index $\leq 1.9$, and an average thickness of individual platelets within a standard deviation of $\leq 20\%$, and on said substrate a coating of $TiO_2$ and optionally an outer protective layer, said pigment having a silver interference color, whereby said pigment exhibits color travel.

2. A silver pigment according to claim 1, wherein the $TiO_2$ coating has a layer thickness of 5-300 nm.

3. A silver pigment according to claim 2, wherein the transparent platelet is an $SiO_2$ platelet.

4. A silver pigment according to claim 1, wherein the average thickness of individual platelets is within a standard deviation of $\leq 10\%$.

5. A silver pigment according to claim 1, wherein the $TiO_2$ is in the rutile modification.

6. A process for the preparation of a silver pigment according to claim 1, comprising a coating of the substrate by wet-chemical methods, by hydrolytic decomposition of metal salts in aqueous medium or by thermal decomposition by a CVD or PVD process.

7. A process according to claim 6, wherein the $TiO_2$ coating is matched to the substrate as to produce a silver interference color.

8. In a paint, coating, printing ink, security printing ink, plastic, button paste, ceramic material, glass, seed coating, dopant for laser marking of plastics or papers, an additive for coloring of foods or pharmaceuticals or, cosmetic formulation comprising a pigment the improvement wherein the pigment is one according to claim 1.

9. A pigment composition comprising at least one binder, at least one silver pigment according to claim 1, and optionally conventional additives.

10. A dry preparation comprising pellets, granules, chips or briquettes of a silver pigment according to claim 1.

* * * * *